3,079,281
SILICONE RESIN SOLUTIONS AND METHOD FOR COATING WITH SAME

John F. Dexter and Harold A. Clark, Midland, Mich., assignors to Dow Corning Corporation, Midland, Mich., a corporation of Michigan
No Drawing. Filed Mar. 16, 1959, Ser. No. 799,430
14 Claims. (Cl. 117—161)

The present invention relates to solutions of organosiloxane resins in certain alcoholic solvents, and to methods of coating articles with such solutions.

Organosiloxane resins (commonly referred to as silicone resins) are now well known materials of commerce. They have become justly famous as coating, impregnating, and molding resins, and are noted for their superb thermal stability, water repellency, and electrical insulating properties. The solvent resistance of such resins, however, has left much to be desired.

The poor solvent resistance of silicone resins has led to problems in commercial processes for applying the resins to various articles. For example, when two or more coats of resin are to be applied to an article, it is conventional to apply the first coat by dipping, spraying, or the like, then to cure or partially cure this coat, and then to apply the next coat, etc. It is almost always necessary to make these applications from an organic solvent solution of the silicone resin, and it has been the commercial practice to employ hydrocarbon solvents such as toluene, xylene, mineral spirits, and the like for this purpose, for these are the solvents in which the resins have been marketed. When such solutions come into contact with the first coat, it is softened and often even "lifted" from the base article. This results in poor adhesion of all of the coats, diminished physical properties of the coatings, undesirable appearance, and general non-uniformity of the coated products.

In many instances portions of the first coat scale off and thus undesirably contaminate the solution remaining in a dipping bath with pieces of film which are then picked up by subsequently treated articles. In processes where the resin solution is sprayed onto the article to be coated, pieces of film which are removed will contaminate the solution being recovered in drip pans and the like. The problem is particularly bothersome in processes where a continuous belt or other conveying means, or the racks or other means which hold the articles being treated, are continuously being recycled through a dipping tank after going through a resin-curing zone. In such a case the equipment itself is a source of scaled-off pieces of film regardless of whether the articles being coated are receiving a single coat or multiple coats of resin.

All of the above discussed problems are particularly acute when the resin solution is heated or becomes heated during the coating process, as for example by dipping articles which are themselves at an elevated temperature. Although some relief from these problems is obtained by using a longer time and/or a higher temperature of cure for the coated articles before recycling them for additional coats of resin, this is often impossible in existing equipment or impractical because of the additional expense or time involved.

In accordance with this invention it has been found that the above problems can be obviated by employing solutions of certain types of silicone resins dissolved in certain alcohols or alcoholic ketones. Thus the invention is particularly concerned with a composition of matter comprising a solution of (I) an organosiloxane resin in which the organic groups attached to silicon are selected from the group consisting of monovalent hydrocarbon radicals and halogenated monovalent hydrocarbon radicals, said resin having an average degree of substitution of from 1.3 to 1.7 of the said organic groups attached to silicon per silicon atom and said resin containing at least 0.8% by weight of silicon-bonded hydroxy groups based on the weight of the organosiloxane, dissolved in (II) a solvent selected from the group consisting of (A) alcohols having from 4 to 9 inclusive carbon atoms and having a boiling point of from 115° to 185° C. at 760 mm. Hg pressure, said alcohols being further selected from the group consisting of primary and secondary monohydric aliphatic hydrocarbon alcohols and primary and secondary monohydric olefinic hydrocarbon alcohols, and (B) hydroxy ketones selected from the group consisting of acetoin, ethylketol, diacetone alcohol, and propioin.

This invention is also concerned with an improvement in the method for coating a base article by the process comprising the steps (1) contacting said article with a resin solution while said article is being conveyed through a resin-contacting zone by conveying means, (2) curing the resulting resin film on said article to a substantially tack-free state while conveying said article through a curing zone by said conveying means, and (3) returning said conveying means through the resin-contacting zone, which improvement comprises employing the defined resin solution in such a process.

Another aspect of the invention lies in the improvement in the method for coating a base article by the process comprising the steps (1) contacting said article with a resin solution, (2) curing the resulting resin film on said article to a substantially tack-free state, and (3) contacting the coated article resulting from steps (1) and (2) with the aforesaid resin solution, which improvement comprises employing the defined resin solution in such a process.

A variation of the latter aspect of the invention lies in applying a first coat of an organosiloxane resin by any means and from any solvent whatsoever, i.e. by using any of the conventional solutions hitherto known, curing said first coat to a substantially tack-free state, and then applying at least one over-coating from the defined resin solutions of this invention.

The organosiloxane component of the resin solution of this invention must have the defined degree of substitution (i.e., from 1.3 to 1.7 organic groups per silicon atom) and the defined minimum content of silicon-bonded hydroxy groups (i.e., at least 0.8% by weight), in order for it to be soluble in the defined alcohols and hydroxy ketones. Preferably the degree of substitution ranges from 1.35 to 1.6 silicon-bonded organic groups per silicon atom, and the most preferred resins are those which contain from about 1.5 to about 5% by weight of silicon-bonded hydroxy groups.

Organosiloxane resins of the above description are well-known materials, and many are commercially available. The organic groups, which are attached to silicon by Si—C bonding, can be any of the organic groups capable of being so attached to silicon atoms in siloxane polymers. Preferably, however, the said organic groups are monovalent hydrocarbon radicals or halogenated monovalent hydrocarbon radicals. A host of such substituted organosiloxanes have been described in the literature. Examples of suitable organic substituents include alkyl radicals such as methyl, ethyl and octadecyl; aryl radicals such as phenyl, xenyl and naphthyl; alkaryl radicals such as tolyl and xylyl; aralkyl radicals such as benzyl and phenylethyl; cycloaliphatic radicals such as cyclopentyl and cyclohexyl; alkenyl radicals such as vinyl, allyl and cyclohexenyl; and halogenated derivatives of any of these radicals, such as chlorophenyl, dibromophenyl, chloromethyl, $\alpha,\alpha,\alpha$-trifluorotolyl, and 3,3,3-trifluoropropyl radicals. The various radicals can be present in any combination, but it is preferred that at least 35 mol percent of the radicals present be alkyl radicals of from 1 to 4 carbon atoms.

The most preferred of the various organic radicals above are the methyl and phenyl radicals, and for most coating or impregnating purposes the best organosiloxane resins are those which are copolymers consisting essentially of from 15 to 45 mol percent monophenylsiloxane units (i.e., of the formula $C_6H_5SiO_{1.5}$), from 0 to 55 mol percent dimethylsiloxane units (i.e., of the formula $(CH_3)_2SiO$), from 0 to 55 mol percent phenylmethylsiloxane units (i.e., of the formula $C_6H_5(CH_3)SiO$), from 0 to 35 mol percent monomethylsiloxane units (i.e., of the formula $CH_3SiO_{1.5}$), and from 0 to 25 mol percent diphenylsiloxane units (i.e., of the formula $(C_6H_5)_2SiO$), the combined dimethylsiloxane and phenylmethylsiloxane units amounting to from 5 to 55 mol percent of the total units present. Preferably the ratio of phenyl radicals to silicon atoms in the copolymer is no more than 0.85:1.

Each of the ranges stated above is inclusive, hence it will be seen that either the dimethylsiloxane units or the phenylmethylsiloxane units can be entirely absent from the system so long as there is at least 5 mol percent of the other unit present. The monomethyl- and diphenylsiloxane units are each entirely optional in this preferred series of copolymers. The most preferred copolymer is that which consists essentially of from 25 to 30 mol percent monophenylsiloxane units, 35 to 45 mol percent phenylmethylsiloxane units, 25 to 30 mol percent monomethylsiloxane units, and from 3 to 8 mol percent diphenylsiloxane units.

The preferred organosiloxane resins described above are shown in greater detail in copending application Serial No. 685,366, filed September 23, 1957, and assigned to the assignee of this invention (now U.S. Patent No. 2,906,734, issued September 29, 1959). It is to be understood that the described resins can be copolymers prepared as a single batch from a given mixture of monomers, or they can be mixtures of two or more copolymers of the defined type.

It is often desirable to mix two different copolymeric materials in order to arrive at a mixture which contains the required amount of silicon-bonded hydroxy groups and which at the same time has the viscosity desired for a particular coating application. Thus, for example, a bodied resin which is relatively high in viscosity and relatively low in hydroxy content can be mixed with an unbodied resin which is relatively high in hydroxy groups and low in viscosity to arrive at a mixture which fulfills a given viscosity requirement.

In using the solvents defined in this invention, a beneficial side effect has been noted in that viscosities of resins dissolved in said solvents are considerably higher than the viscosities of the same resins dissolved in the conventional hydrocarbon solvents. Thus this invention allows the use of unbodied hydrolyzates in situations where the hitherto known hydrolyzate solutions would have been undesirable because of their low viscosity.

The solvents employed herein can be primary monohydric aliphatic hydrocarbon alcohols, secondary monohydric aliphatic hydrocarbon alcohols, primary monohydric olefinic hydrocarbon alcohols, secondary monohydric olefinic hydrocarbon alcohols, or the hydroxy ketones known as acetoin, ethylketol, diacetone alcohol, and propioin. From among the defined alcohols, however, only those which have a boiling point of from 115° to 185° C. at 760 mm. Hg pressure and which contain from 4 to 9 inclusive carbon atoms are suitable. The boiling point limitations result in most of the 4 carbon branched chain alcohols being unsuitable because of a low boiling point and the 8 or 9 carbon straight chain alcohols being unsuitable because of high boiling point.

Examples of suitable alcohols are set forth in the list below, along with their common synonyms and approximate boiling points in degrees centigrade.

| Alcohol | B.P. |
|---|---|
| n-Butyl alcohol (propylcarbinol) | 118 |
| 2-ethyl-1-butanol | 149 |
| 3-methyl-1-butanol (isoamyl alcohol) | 130 |
| 3,3-dimethyl-2-butanol (methyl t-butylcarbinol) | 122 |
| 1-pentanol (butylcarbinol) | 138 |
| 2-methyl-1-pentanol | 148 |
| 3-methyl-1-pentanol | 154 |
| 4-methyl-1-pentanol (isoamylcarbinol) | 150 |
| 2-pentanol (methylpropylcarbinol) | 119 |
| 4-methyl-2-pentanol (methylisobutylcarbinol | 131 |
| 3-pentanol (diethylcarbinol) | 116 |
| 2,4-dimethyl-3-pentanol (diisopropylcarbinol) | 140 |
| 2-methyl-3-pentanol (ethylisopropylcarbinol) | 130 |
| 1-hexanol (amylcarbinol) | 157 |
| 2-ethyl-1-hexanol | 184 |
| 2-methyl-1-hexanol | 163 |
| 5-methyl-1-hexanol (isohexylcarbinol) | 168 |
| 2-hexanol (butylmethylcarbinol) | 140 |
| 5-methyl-2-hexanol (isoamylmethylcarbinol) | 149 |
| 3-hexanol (ethylpropylcarbinol) | 135 |
| 5-methyl-3-hexanol (ethylisobutylcarbinol) | 148 |
| 1-heptanol (n-heptyl alcohol) | 176 |
| 2-heptanol (amylmethylcarbinol) | 160 |
| 4-heptanol (dipropylcarbinol) | 155 |
| 2,6-dimethyl-4-heptanol (diisobutylcarbinol) | 174 |
| 2-octanol (methylhexylcarbinol) | 179 |
| 1-penten-3-ol (ethylvinylcarbinol) | 115 |
| 4-penten-1-ol (β-allylethyl alcohol) | 141 |
| 4-penten-2-ol (allylmethylcarbinol) | 116 |
| 2-buten-1-ol (crotyl alcohol) | 118 |

In the hydroxy ketones, acetoin is the compound 3-hydroxy-2-butanone boiling at about 148° C. Ethylketol is the compound 1-hydroxy-2-butanone, boiling at about 51.5° C. at 12 mm. Hg. Propioin is the compound 4-hydroxy-3-hexanone having a boiling range of from about 57° to 78° C. at 10 mm. Hg. The well-known diacetone alcohol is the compound 4-hydroxy-4-methyl-2-pentanone, boiling at about 164° to 166° C.

Although suitable alcohols of the required boiling range may have from 4 to 9 inclusive carbon atoms, the most preferred alcohols are those of from 6 to 7 carbon atoms, and preferably alcohols boiling from 130° to 170° C. are used. When there is any olefinic unsaturation it is preferred that it be at the terminal carbon atom.

If desired, the defined solvents can be mixed and used in any combination in order to arrive at the best solubility characteristics and flash point for a particular use. In general, the hydroxy ketones are stronger solvents than the alcohols for those resins which contain the lower ranges of hydroxy groups. From both an economical and performance standpoint, the two most preferred solvents are diacetone alcohol and methylisobutyl carbinol (i.e., 4-methyl-2-pentanol).

Ordinarily the defined solvents will be used as substantially the only solvents present in the system. In the preparation of these resin solutions, however, it is often more practical and economical to prepare the resin in a conventional hydrocarbon solvent such as toluene, xylene, or mineral spirits, then to devolatilize the resin solution under reduced pressure to substantially 100% resin solids and take up the latter in the desired alcoholic or hydroxy ketone solvent. It is often impractical to remove the last trace of hydrocarbon solvent when operating in this manner, hence in a commercial operation the solvent portion of the solutions of this invention can contain up to (i.e., not more than) about 5% by weight of the hydrocarbon solvent. In many applications, the presence of up to 5% by weight of a hydrocarbon solvent in the defined alcohols or hydroxy ketones will not seriously impair the "non-lifting" qualities of the resulting resin solution. In general, however, it is preferred that there be less than 1% of such hydrocarbon solvents or other extraneous solvents in the alcohols or hydroxy ketones as they are present in the final solution of the present invention. Thus at least 95% by weight, and preferably at least 99% by weight, of the solvent present in the resin solutions employed herein should be the defined alcohols or hydroxy ketones.

It is preferred that the particular solvent employed in this invention be a liquid at room temperature. The use of higher melting solvents within the defined range is not precluded, however, for in many instances the resin solution may be used at elevated temperatures. Also the presence of other of the defined solvents, or of the resin itself, may depress the melting point of an otherwise solid solvent.

A curing catalyst for the organosiloxane resin is not absolutely essential in the resin solution of this invention because, as is well known, such resins can be cured by heat alone. For most commercial operations, however, it is preferred that a curing catalyst be present at the time the resin is applied to the article being coated or impregnated. A wide variety of organosiloxane curing agents are known in the art, and any of such agents are applicable here. Of course it is preferred that the catalyst employed be one which is soluble in the defined solution to the extent of the small quantities of catalyst which are ordinarily used, but where solubility is poor, mere dispersion of the catalyst may suffice.

The preferred catalysts are the alkaline organosiloxane curing catalysts (often also referred to as alkaline organosiloxane condensation catalysts). These include alkali metal hydroxides such as the hydroxides of sodium, potassium, and caesium; alkali metal salts of silane triols or of siloxanolates; amine type condensation catalysts such as the alkanolamines (e.g., triethanolamine and tributanolamine) and aminoalkyl substituted silanes and siloxanes; and quaternary phosphonium compounds such as tetramethyl phosphonium hydroxide, tetraethyl phosphonium hydroxide, phenyltrimethyl phosphonium hydroxide, dimethyldiethyl phosphonium hydroxide, tetramethyl phosphonium methoxide, and tetrabutyl phosphonium butoxide.

The more preferred alkaline catalysts are the quaternary ammonium compounds of the formula $RR'_3NOR''$ where R and R' are alkyl radicals such as methyl, ethyl, propyl, butyl, and octyl; cycloalkyl radicals such as cyclohexyl and cycloheptyl; aryl radicals such as phenyl and xenyl; alkaryl radicals such as tolyl and xylyl; and aralkyl radicals such as benzyl and phenylethyl. These R and R' radicals can be the same or different radicals. The R radicals can also be alkenyl radicals such as allyl or hexenyl, or cycloalkenyl such as cyclohexenyl, or hydroxylated aliphatic and cycloaliphatic radicals such as hydroxypropyl and 4-hydroxycyclohexyl radicals, in any of which cases it is preferred that the R' radicals be alkyl radicals of less than 3 carbon atoms. The R'' radical or group can be a hydrogen atom, or an alkyl radical such as methyl, ethyl, propyl, or butyl, or an aliphatic acyl radical of less than 9 carbon atoms having no more than one halogen atom beta to the carbonyl groups, or a benzoyl radical.

The above defined preferred catalysts are thus the quaternary ammonium hydroxides or alkoxides, and the defined salts thereof. Of the first two types, the preferred species are the tetraalkyl ammonium hydroxides, ethoxides, and butoxides. The salts are the most preferred of all of these catalysts, however, and in the salts it is preferred that R be an aliphatic hydrocarbon, hydroxylated aliphatic hydrocarbon, cycloaliphatic hydrocarbon, hydroxylated cycloaliphatic hydrocarbon, or aralkyl radical, and that each R' be an alkyl radical of less than 3 carbon atoms, it being understood that the R' radicals can be the same or different.

The salts can be prepared, for example, by reacting the corresponding hydroxide or alkoxide with the corresponding acid, or by reacting a salt of a weaker acid with the corresponding acid, as shown in greater detail in the aforementioned copending application Serial No. 685,366. Examples of suitable salts include tetramethylammonium 2-ethylhexoate, benzyltrimethylammonium acetate, tetramethylammonium benzoate, gamma-hydroxypropyltrimethylammonium propionate, β-hydroxyethyltrimethylammonium 2-ethylhexoate, octadecyltrimethylammonium formate, benzyltriethylammonium butyrate, β-phenylethyltrimethylammonium - α - chloropropionate, cyclopentyltrimethylammonium - β - bromopropionate, allyltrimethylammonium acetate, hexenylethyldimethylammonium formate, cyclohexenyltrimethylammonium acetate, 4 - hydroxycyclohexyltrimethylammonium - β-fluoropropionate, tetraethylammonium - monoiodoacetate, myricyltrimethylammonium formate and isopropyltrimethylammonium benzoate. It should be understood that a mixture of two or more of any of the above salts can be employed.

The alkaline catalysts are generally used in an amount of at least 0.01% by weight based on the weight of the organosiloxane. Ordinarily no more than 1% by weight of the catalyst will be required, and the preferred range for the quaternary ammonium catalysts lies in the region of from about 0.05 to 0.5% by weight.

If desired, the alkaline catalysts discussed above can be added to the resin solutions of this invention just prior to use of the resin. For the user's convenience, however, it is preferred that the catalysts be incorporated by the resin manufacturer. In many instances this early incorporation of the catalyst leads to premature gellation of the resin during storage. The latter problem can be eliminated, or at least greatly diminished, by adding certain buffer acids to the catalyzed system. The acids which have this buffering effect are the aliphatic monocarboxylic acids of less than 5 carbon atoms which contain no more than one halogen atom beta to the carboxyl group, and benzoic acid. Examples of the former type include formic, acetic, propionic, butyric, isobutyric, bromoacetic, 2,4-dichlorobutyric, β-fluoropropionic, and monochloroacetic.

The above acids have a desirable effect in systems containing any of the above described alkaline curing catalysts. The acids are generally employed in an amount of from about 0.01 to 1% by weight based on the weight of the organosiloxane present. The optimum amount will vary depending upon the amount and type of alkaline catalyst present, the type of resin being used, and the degree of stability required in the resin solution.

When the preferred quaternary ammonium salts are being used as the catalyst, it is preferred that the amount of acid employed be from about 2 to 4 mols of acid per mol of the salt. In all cases the amount of acid should be sufficient to render the siloxane-catalyst composition non-alkaline, i.e. neutral or on the acid side. One good method of assuring the use of sufficient acid is to add the acid to the salt until the resulting solution tests "neutral" to the indicator bromcresol purple in a butanol-toluene solution. The resulting catalyst-acid solution can then be added to the resin solution. Of course the invention is not limited to this type of operation, and a different order of addition can be used if desired. Mixtures of two or more of the above acids can be used, and it is to be understood that the acid used need not correspond to the acyl radical of the ammonium salt. Further details in regard to the use of the buffered salts will be found in the aforementioned application Serial No. 685,366.

Metal salts of carboxylic acids are well known curing catalysts for silicone resins, and, if desired, such salts can also be present in the solutions of this invention. Other additives such as fillers, pigments, stabilizers, and the like, are conventionally employed in conjunction with silicone resins, and any of such additives can also be used herein if desired.

The concentration of resin solids (i.e., the organosiloxane per se) in the solutions of this invention is subject to wide variations, and depends largely upon the particular use to be made of the resin as well as upon the degree of polymerization of the resin. In general, however, it is preferred that there be at least 40% by weight of the defined solvent present, based on the weight of the final solution. For most purposes it is best if the quantity of solvent used amounts to from 40 to 60% by weight of the final composition, thus the resin concentration will likewise ordinarily range from about 40 to about 60 percent.

The resin solutions defined herein can be used to coat and/or impregnate any base article whatsoever, and can be used wherever the conventional silicone resin solutions of the prior art have been used. The base article can be one of a single material such as, for example, ceramic, glass cloth, asbestos, or metals such as copper, aluminum, steel, etc. in any form, e.g., as rods, wires, sheets, or shaped parts, or the article can be any combination of materials in any degree of complexity.

One of the most important uses of the defined resins is to provide insulating coatings for electrical conductors. The latter can be in their simple unassembled form, e.g. metallic conductors in the form of wires, rods, bars, etc. (both with and without the presence of other insulation such as glass cloth, cambric, organic resins, varnished paper, and the like), or in assembled form as transformers, rotors or stators for motors and generators, and various electronic assemblies.

Several important advantages of the defined resin solutions are illustrated in the dipping of dry-type transformers. In this commercial operation, completely assembled transformers are vacuum impregnated and coated with a silicone resin. The transformers themselves contain many materials, including paper, asbestos, cambric, silicone rubber, synthetic organic rubber, and various resins such as polyvinyl formals, polyesters, epoxies, acetates, and silicone-alkyd resins, as well as the metallic conductors, casings, and frames. The solvent in the resin solutions of the present invention does not attack any of these components. The transformers are carried into the dipping tank on racks, and then are conducted through a curing zone on the same racks. Untreated transformers are then placed in the racks, and the cycle is repeated. The film of resin which is thus built up on the racks is not lifted by the defined solvents, and no pieces of resin come loose to contaminate the solution in the dipping tank. The actual dipping step of this operation is best carried out under reduced pressure, i.e., a typical "vacuum impregnation" technique is employed. The resin solutions of this invention show little or no tendency to foam during such a step, as compared to the rather bad foaming problems which arise when the hydrocarbon solvents of the prior art are employed.

The coating and impregnating processes carried out in accordance with this invention can be the conventional processes in every respect, except with regard to the resin solution employed. Use of the defined solvents does not change the curing schedules, and the usual curing conditions can be followed. Obviously the required curing conditions will vary with the type of resin, absence or presence of catalyst and type of catalyst, and thickness of the resin film. Longer exposure at lower temperatures is necessary to achieve the same degree of cure obtainable in shorter times at higher temperatures. When multiple coats are to be given to an article, it is optional whether a complete cure is attained between coats or whether a mere tack-free state is sufficient. In systems containing the preferred ammonium salt catalysts, tack-free films can generally be obtained after from 15 minutes to 1 hour at 150° C. Ordinarily, temperatures of at least 100° C. will be employed.

Decomposition products obtainable from some of the solvents at elevated temperatures, as for example the acetone obtainable from diacetone alcohol, ordinarily have no adverse effect upon the final products. If desired, solvent recovery systems can be incorporated into the drying and curing steps of the defined processes.

The following examples are illustrative only. All parts and percentages are by weight unless otherwise specified.

*Example 1*

A mixture was prepared containing equal parts of (1) a copolymeric organosiloxane containing about 3.3% silicon-bonded hydroxy groups and consisting essentially of 31.33 mol percent each of phenylmethylsiloxane, monophenylsiloxane, and monomethylsiloxane units and 6 mol percent diphenylsiloxane units, and (2) a copolymeric organosiloxane containing about 3.5% silicon-bonded hydroxy units and consisting essentially of 45 mol percent phenylmethylsiloxane units, 20 mol percent monophenylsiloxane units, 25 mol percent monomethylsiloxane units and 10 mol percent diphenylsiloxane units. Each organosiloxane was in its substantially 100% resin solids form. The mixture was stirred and heated at 160° to 170° C. in the presence of 0.1% zinc added as zinc 2-ethylhexoate, forming a viscous homogeneous resinous mass. Heating and stirring were continued until the viscosity of the mass had increased appreciably. The mass was then cooled and dissolved in diacetone alcohol to provide a solution of 50% resin solids. The resinous component of this solution had the average composition of about 37.9 mol percent phenylmethylsiloxane units, 28.3 mol percent monomethylsiloxane units, 25.85 mol percent monophenylsiloxane units and 7.95 mol percent diphenylsiloxane units, and contained about 1.4% silicon-bonded hydroxy groups.

A catalyst solution was prepared by mixing 15.7 parts of a 20% solution of trimethyl β-hydroxyethylammonium 2-ethylhexoate in n-butanol, 6.6 parts of isopropanol, 9.6 parts of additional n-butanol and 3.1 parts of glacial acetic acid. The amount of acid added was sufficient to render the solution neutral to bromcresol purple.

Sufficient of the catalyst solution was added to the 50% resin solution to provide 0.2% of the ammonium salt based upon the weight of the organosiloxane. Various articles were dipped in this catalyzed resin solution and were allowed to air-dry. The articles were cured at about 150° C. for 1 hour and were then redipped in the catalyzed resin solution. It was found that there was no softening, loosening, or lifting of the first resin coat from its contact with the resin solution in the second dipping operation. The articles dipped in this manner included aluminum wire, glass cloth and an iron pipe.

*Example 2*

A solution of a copolymeric organosiloxane containing about 3.5% silicon-bonded hydroxy groups and consisting essentially of about 45 mol percent phenylmethylsiloxane units, 25 mol percent monomethylsiloxane units, 20 mol percent monophenylsiloxane units, and 10 mol percent diphenylsiloxane units in xylene at about 50% resin solids was gently heated under a reduced pressure of about 20 to 30 mm. Hg until substantially all of the solvent had been removed. The solvent-free resin mass was then dissolved in diacetone alcohol to provide a solution containing 50% resin solids, designated solution "A" hereinafter.

A 50% solution in xylene of a copolymeric organosiloxane containing about 1.1% silicon-bonded hydroxy groups and consisting essentially of about 31.4 mol percent phenylmethylsiloxane units, 34 mol percent monomethylsiloxane units, and 34.6 mol percent monophenylsiloxane units, was freed of its solvent under reduced pressure until it was substantially 100% resin solids. This mass was then dissolved in diacetone alcohol to provide a solution containing 50% resin solids. The latter solution was then mixed with an equal weight of solution "A" from above, thus providing a 50% solution in diacetone alcohol of a resin mixture having the average formulation of about 35.2 mol percent phenylmethylsiloxane, 31.5 mol percent monomethylsiloxane, 30.5 mol percent monophenylsiloxane, and 2.8 mol percent diphenylsiloxane units. To this final solution there was added 0.1% zinc as zinc 2-ethylhexoate, and after standing overnight the solution was filtered and was found to have a viscosity of 385 cs. at 25° C.

A catalyst solution was then prepared by mixing 915 parts of a 35% solution of benzyltrimethylammonium hydroxide in methanol, 1645 parts n-butanol, and 640 parts of glacial acetic acid. The amount of acid added was sufficient to convert the ammonium hydroxide compound to the corresponding acetate and to render the solution neutral to bromcresol purple.

Various portions of the final resin solution prepared above were mixed with sufficient of the above described catalyst solution to provide 0.08, 0.12, 0.16, and 0.2% respectively of the acetate salts based on the weight of the organosiloxane resin. Coils of aluminum wire and aluminum test panels were respectively dipped into the catalyzed resin solutions, then air-dried for 30 minutes, cured to a tack-free state by being heated for 15 minutes at 100° C., and redipped in their respective resin solutions. No lifting of the first resinous coat was observed regardless of how long the single coated articles were left in contact with the resin solutions during their second dipping operation.

*Example 3*

Solutions were prepared containing 60% resin solids in methylisobutylcarbinol and in diacetone alcohol respectively. The resin employed was an organosiloxane copolymer containing about 3.7% silicon-bonded hydroxy groups and consisting essentially of 27 mol percent monophenylsiloxane units, 40 mol percent phenylmethylsiloxane units, 28 mol percent monomethylsiloxane units, and 5 mol percent diphenylsiloxane units. The solution in methylisobutylcarbinol was found to have a viscosity of about 67 cs. and that in diacetone alcohol had a viscosity of about 90 cs., both measured at 25° C. To each solution there was added sufficient of the catalyst solution from Example 2 to provide 0.15% of the acetate salt based on the weight of the organosiloxane. Steel angle irons were dipped in each of the solutions respectively, then air-dried and cured as in Example 2, and redipped and cured repeatedly. There was no evidence of any lifting of any of the undercoatings when they were redipped in the resin solution, regardless of the length of exposure to the respective resin solutions during the dipping operation.

The effect of elevated temperatures upon the operation was tested by holding the resin solutions at 50° C. and heating the angle irons to 150° C. just prior to each immersion. A total of 16 coats was put on in this fashion, and in spite of these elevated temperatures, there was no evidence of any lifting of the undercoatings.

*Example 4*

The resin of Example 3 was dissolved in diacetone alcohol to provide a 50% resin solids solution. Another portion of the same resin was dissolved in xylene to provide a 50% resin solids solution. Each solution was catalyzed as in Example 3. Some aluminum panels were dipped in the xylene resin solution, others were dipped in the diacetone alcohol solution, and all were then air-dried and cured for one hour at 150° C. Some of each type of the coated panels were then given a second coat by being dipped in the diacetone alcohol solution, and it was observed that there was no lifting of the first resin coat regardless of the length of time the panels were immersed in the solution. As a comparison, the remaining panels were dipped into the xylene resin solution and it was found that the first resin coat was entirely lifted in less than 2 minutes.

*Example 5*

Resin solutions containing 50% resin solids in diacetone alcohol or methylisobutylcarbinol were prepared from the following resins.

Resin A: Copolymer of 30% $MeSiO_{1.5}$, 20% $PhSiO_{1.5}$, and 50% PhMeSiO units, 1.8% OH.

Resin B: Copolymer of 25% $MeSiO_{1.5}$, 35% $PhSiO_{1.5}$, 20% $Me_2SiO$, and 20% $Ph_2SiO$ units, 3.2% OH.

Resin C: Mixed equal parts of (1) copolymer of 35% PhMeSiO, 10% $Me_2SiO$, 25% $MeSiO_{1.5}$, and 30% $PhSiO_{1.5}$ units; containing 1% OH, and (2) same copolymer containing 3% OH.

Resin D: Mixed 75 parts of (1) copolymer of 28% $MeSiO_{1.5}$, 27% $PhSiO_{1.5}$, 40% PhMeSiO, 5% $Ph_2SiO$ units; containing 1% OH, and 25 parts of (2) same copolymer containing 3.5% OH.

The percentages of the various polymeric units in the above copolymers are molar percentages, and Me and Ph have been used to represent methyl and phenyl radicals respectively. Weight percent of silicon-bonded hydroxy groups has been indicated as "percent OH."

When these resin solutions are mixed with 0.2% of β-hydroxyethyltrimethylammonium chloroacetate, or the corresponding benzoate, or 4-hydroxycyclohexyltrimethylammonium acetate, or allylethyldimethylammonium butyrate, or cyclopentyltrimethylammonium acetate, aluminum panels can be dipped in the catalyzed solutions, then air-dried and cured for 1 hour at 150° C., and then redipped in the solutions, with no lifting of the first coat of resin. Similar results are obtained when acetoin, ethylketol, propioin, n-butyl alcohol, isoamylcarbinol, 2-ethyl-1-hexanol, butylmethylcarbinol, or ethylvinylcarbinol are employed as the solvent for the same resins.

That which is claimed is:

1. A composition of matter consisting essentially of a solution of (I) a copolymeric organosiloxane having a ratio of phenyl radicals to silicon atoms not in excess of 0.85:1, an average degree of substitution of from 1.3 to 1.7 organic radicals attached to silicon per silicon atom, and containing at least 0.8% by weight of silicon-bonded hydroxyl groups based on the weight of the organosiloxane oxane, said organosolix consisting essentially of (1) from 15 to 45 mol percent units of the formula $C_6H_5SiO_{1.5}$, (2) from 0 to 55 mol percent units of the formula $C_6H_5(CH_3)SiO$, (3) from 0 to 55 mol percent units of the formula $(CH_3)_2SiO$, (4) from 0 to 35 mol percent units of the formula $CH_3SiO_{1.5}$, and (5) from 0 to 25 mol percent units of the formula $(C_6H_5)_2SiO$, the sum of the (2) and (3) units being from 5 to 55 mol percent of the total polymeric units, dissolved in (II) a solvent selected from the group consisting of (A) alcohols having from 4 to 9 inclusive carbon atoms and having a boiling point of from 115° to 185° C. at 760 mm. Hg pressure, said alcohols being further selected from the group consisting of primary- and secondary-monohydric aliphatic hydrocarbon alcohols and primary- and secondary-monohydric olefinic hydrocarbon alcohols, and (B) hydroxy ketones selected from the group consisting of acetoin, ethylketol, diacetone alcohol, and propioin, the amount of any hydrocarbon solvent present in said solution being no more than 5% by weight based on the total weight of the said alcohols and hydroxy ketones.

2. A composition of matter in accordance with claim 1 wherein the solution contains at least 0.01% by weight based on the weight of the organosiloxane of an alkaline curing catalyst for organosiloxanes, and in which solution there is at least 40% by weight of the solvent (II) of claim 1.

3. A compositon of matter in accordance with claim 1 wherein the solution contains (III) at least 0.01% by weight based on the weight of the organosiloxane of a catalyst compound of the formula $RR'_3NOR''$ in which R is selected from the group consisting of aliphatic hydrocarbon radicals, hydroxylated aliphatic hydrocarbon radicals, cycloaliphatic hydrocarbon radicals, hydroxylated cycloaliphatic hydrocarbon radicals, and aralkyl radicals, R' is an alkyl radical of less than 3 carbon atoms and R'' is an acyl radical selected from the group consisting of benzoyl and aliphatic acyl radicals of less than 9 carbon atoms having no more than one halogen atom beta to the carboxyl group, and (IV) at least sufficient acid selected from the group consisting of benzoic acid and aliphatic monocarboxylic acids of less than 5 carbon atoms containing no more than one halogen atom beta to the carboxyl group, to render the composition non-alkaline, there being from 40% to 60% by weight of the solvent (II) of claim 1 based on the weight of the composition.

4. A composition of matter consisting essentially of a solution of (I) a copolymeric organosiloxane having a phenyl to silicon ratio not in excess of 0.85:1, a degree of substitution of from 1.3 to 1.7, and containing at least 0.8% by weight of silicon-bonded hydroxyl groups based on the weight of the organosiloxane, said organosiloxane consisting essentially of (1) from 15 to 45 mol percent monophenylsiloxane units, (2) from 0 to 55 mol percent phenylmethylsiloxane units, (3) from 0 to 55 mol percent dimethylsiloxane units, (4) from 0 to 35 mol percent monomethylsiloxane units, and (5) from 0 to 25 mol percent diphenylsiloxane units, the sum of the (2) and (3) units being from 5 to 55 mol percent of the total polymeric units (II) at least .01% by weight based on the weight of the organosiloxane of benzyl trimethyl ammonium acetate, and (III) at least sufficient acetic acid to render the composition nonalkaline, dissolved in (IV) methylisobutylcarbinol, said methylisobutylcarbinol being present in a quantity of from 40 to 60% by weight based on the weight of the composition, the amount of any hydrocarbon solvent present in said solution being no more than 5% by weight based on the weight of the methylisobutylcarbinol.

5. A composition of matter consisting essentially of a solution of (I) a copolymeric organosiloxane having a phenyl to silicon ratio not in excess of 0.85:1, a degree of substitution of from 1.3 to 1.7, and containing at least 0.8% by weight of silicon-bonded hydroxyl groups based on the weight of the organosiloxane, said organosiloxane consisting essentially of (1) from 15 to 45 mol percent monophenylsiloxane units, (2) from 0 to 55 mol percent phenylmethylsiloxane units, (3) from 0 to 55 mol percent dimethylsiloxane units, (4) from 0 to 35 mol percent monomethylsiloxane units, and (5) from 0 to 25 mol percent diphenylsiloxane units, the sum of the (2) and (3) units being from 5 to 55 mol percent of the total polymeric units, (II) at least .01% by weight based on the weight of the organosiloxane of benzyl trimethyl ammonium acetate, and (III) at least sufficient acetic acid to render the composition nonalkaline, dissolved in (IV) sufficient diacetone alcohol to provide from 40 to 60% by weight of said diacetone alcohol based on the weight of the composition, the amount of any hydrocarbon solvent present in said solution being no more than 5% by weight based on the weight of the diacetone alcohol.

6. In the method for coating a base article by the process comprising the steps (1) contacting said article with a resin solution while said article is being conveyed through a resin-contacting zone by conveying means, (2) curing the resulting resin film on said article to a substantially tack-free state while conveying said article through a curing zone by said conveying means, and (3) returning said conveying means through the resin-contacting zone, the improvement which comprises employing as the resin solution the composition of claim 3.

7. In the method for coating a base article by the process comprising the steps (1) contacting said article with a resin solution while said article is being conveyed through a resin-contacting zone by conveying means, (2) curing the resulting resin film on said article to a substantially tack-free state while conveying said article through a curing zone by said conveying means, and (3) returning said conveying means through the resin contacting zone, the improvement which comprises employing as the resin solution the composition of claim 4.

8. In the method for coating a base article by the process comprising the steps (1) contacting said article with a resin solution while said article is being conveyed through a resin-contacting zone by conveying means, (2) curing the resulting resin film on said article to a substantially tack-free state while conveying said article through a curing zone by said conveying means, and (3) returning said conveying means through the resin-contacting zone, the improvement which comprises employing as the resin solution a composition of matter consisting essentially of a solution of (I) a copolymeric organosiloxane having a phenyl-to-silicon ratio not in excess of 0.85:1, a degree of substitution of from 1.3 to 1.7, and containing at least 0.8% by weight of silicon-bonded hydroxyl groups based on the weight of the organosiloxane, said organosiloxane consisting essentially of (A) from 15 to 45 mol percent monophenylsiloxane units, (B) from 0 to 55 mol percent phenylmethylsiloxane units, (C) from 0 to 55 mol percent dimethylsiloxane units, (D) from 0 to 35 mol percent monomethylsiloxane units, and (E) from 0 to 25 mol percent diphenylsiloxane units, the sum of the (B) and (C) units being from 5 to 55 mol percent of the total polymeric units, (II) at least .01% by weight based on the weight of the organosiloxane of benzyl trimethyl ammonium acetate, and (III) at least sufficient acetic acid to render the composition nonalkaline, dissolved in (IV) sufficient diacetone alcohol to provide from 40 to 60% by weight of said diacetone alcohol based on the weight of said diacetone alcohol.

9. In the method for coating a base article by the process comprising the steps (1) contacting said article with a resin solution, (2) curing the resulting resin film on said article to a substantially tack-free state, and (3) contacting the coated article resulting from steps (1) and (2) with the aforesaid resin solution, the improvement which comprises employing as the resin solution the composition of claim 3.

10. In the method for coating a base article by the process comprising the steps (1) contacting said article with a resin solution, (2) curing the resulting resin film on said article to a substantially tack-free state, and (3) contacting the coated article resulting from steps (1) and (2) with the aforesaid resin solution, the improvement which comprises employing as the resin solution the composition of claim 4.

11. In the method for coating a base article by the process comprising the steps (1) contacting said article with a resin solution, (2) curing the resulting resin film on said article to a substantially tack-free state, and (3) contacting the coated article resulting from steps (1) and (2) with the aforesaid resin solution, the improvement which comprises employing as the resin solution a composition of matter consisting essentially of a solution of (I) a copolymeric organosiloxane having a phenyl-to-silicon ratio not in excess of 0.85:1, a degree of substitution of from 1.3 to 1.7, and containing at least 0.8% by weight of silicon-bonded hydroxyl groups based on the weight of the organosiloxane, said organosiloxane consisting essentially of (A) from 15 to 45 mol percent monophenylsiloxane units, (B) from 0 to 55 mol percent phenylmethylsiloxane units, (C) from 0 to 55 mol percent dimethylsiloxane units, (D) from 0 to 35 mol percent monomethylsiloxane units, and (E) from 0 to 25 mol percent diphenylsiloxane units, the sum of the (B) and (C) units being from 5 to 55 mol percent of the total polymeric units, (II) at least .01% by weight based on the weight of the organosiloxane of benzyl trimethyl ammonium acetate, and (III) at least sufficient acetic acid to render the composition nonalkaline, dissolved in (IV) sufficient diacetone alcohol to provide from 40 to 60% by weight of said diacetone alcohol based on the weight of the composition, the amount of any hydrocarbon solvent present in said solution being no more than 5% by weight based on the weight of said diacetone alcohol.

12. In the method for coating a base article with a plurality of coats of an organopolysiloxane resin by the process comprising the steps (1) laying down a first coat of an organosiloxane resin, (2) curing said first coat to a substantially tack-free state, and (3) applying to the first coat at least one over-coating from an organosiloxane resin solution, the improvement which comprises employing as the resin solution the composition of claim 1.

13. A composition of matter consisting essentially of a solution of (I) a copolymeric organosiloxane containing from 1.5 to 5% by weight of silicon-bonded hydroxy groups based on the weight of the organosiloxane and consisting essentially of from 25 to 30 mol percent monophenylsiloxane units, from 35 to 45 mol percent phenylmethylsiloxane units, from 25 to 30 mol percent monomethylsiloxane units and from 3 to 8 mol percent diphenylsiloxane units, (II) from 0.05 to 0.4% by weight based on the weight of the organosiloxane of benzyltrimethyl ammonium acetate, and (III) sufficient acetic acid to render (II) neutral to bromcresol purple, dissolved in (IV) sufficient methylisobutylcarbinol to provide from 40 to 60% by weight of said methylisobutylcarbinol based on the weight of the composition, the amount of any hydrocarbon solvent present in said solution being no more than 5% by weight based on the weight of the methylisobutylcarbinol.

14. A composition of matter consisting essentially of a solution of (I) a copolymeric organosiloxane containing from 1.5 to 5% by weight of silicon-bonded hydroxy groups based on the weight of the organosiloxane and consisting essentially of from 25 to 30 mol percent monophenylsiloxane units, from 35 to 45 mol percent phenylmethylsiloxane units, from 25 to 30 mol percent monomethylsiloxane units and from 3 to 8 mol percent diphenylsiloxane units, (II) from 0.05 to 0.4% by weight based on the weight of the organosiloxane of benzyltrimethyl ammonium acetate, and (III) sufficient acetic acid to render (II) neutral to bromcresol purple, dissolved in (IV) sufficient diacetone alcohol to provide from 40 to 60% by weight of said diacetone alcohol based on the weight of the composition, the amount of any hydrocarbon solvent present in said solution being no more than 5% by weight based on the weight of the diacetone alcohol.

References Cited in the file of this patent

UNITED STATES PATENTS

| | | |
|---|---|---|
| 2,154,057 | Thielking | Apr. 11, 1939 |
| 2,345,390 | Flynn | Mar. 28, 1944 |
| 2,389,379 | McCulloch | Nov. 20, 1945 |
| 2,679,495 | Bunnell | May 25, 1954 |
| 2,683,674 | Hatcher et al. | July 13, 1954 |
| 2,724,704 | Millar | Nov. 22, 1955 |
| 2,743,192 | White | Apr. 24, 1956 |
| 2,749,326 | Hirsch | June 5, 1956 |
| 2,785,147 | Kantor | Mar. 12, 1957 |
| 2,803,613 | Kather et al. | Aug. 20, 1957 |
| 2,911,386 | Olson et al. | Nov. 3, 1959 |
| 2,970,126 | Brown | Jan. 31, 1961 |